United States Patent [19]

Katahara

[11] Patent Number: 5,218,573
[45] Date of Patent: Jun. 8, 1993

[54] WELL PERFORATION INSPECTION

[75] Inventor: Keith W. Katahara, Allen, Tex.

[73] Assignee: Atlantic Richfield Company, Los Angles, Calif.

[21] Appl. No.: 761,110

[22] Filed: Sep. 17, 1991

[51] Int. Cl.$^5$ .............................. G01V 1/40
[52] U.S. Cl. ...................... 367/32; 367/35; 367/86
[58] Field of Search ............ 367/25, 29, 32, 35, 367/69, 86; 181/102, 105, 401; 73/151, 152

[56] References Cited

U.S. PATENT DOCUMENTS

| | | | |
|---|---|---|---|
| Re. 31,607 | 6/1984 | Vogel et al. | 367/86 |
| 4,130,816 | 12/1978 | Vogel et al. | 181/102 |
| 4,587,641 | 5/1986 | Di Foggio | 367/35 |
| 4,852,069 | 7/1989 | Clerke et al. | 367/35 |
| 4,987,969 | 1/1991 | Boyle et al. | 181/102 |

*Primary Examiner*—Ian J. Lobo
*Attorney, Agent, or Firm*—Michael F. Martin

[57] ABSTRACT

Perforations into an earth formation from a wellbore may be analyzed as to location, shape and radial depth by placing an inspection apparatus in the wellbore including an acoustic signal transmitter for transmitting acoustic signals over a broad bandwidth for a limited time, and receiving reflected or resonant acoustic signals excited in nearby perforations. The amplitude of the resonant frequency will reach a maximum when the perforation is at a midpoint between the transmitter and receiver. The resonant frequencies may be plotted as a function of signal power or intensity to determine perforation radial depth, based on the assumption that the perforation approximates an elongated cylindrical tube. Resonant frequency breadths may be compared to determine relative permeability of the formation and resonant frequency values may be compared to determine the shape of the perforation cavity.

5 Claims, 3 Drawing Sheets

WELL PERFORATION INSPECTION

BACKGROUND OF THE INVENTION

Field of the Invention

The present invention pertains to an acoustic method and apparatus for determining the depth and shape of well perforations and other characteristics such as formation permeability by detecting resonant frequencies of acoustic signals transmitted into the perforation from the wellbore and detected by a signal receiver in the wellbore.

Background

In the production of oil and gas from subterranean formations, for example, there is often a need for inspecting the so-called casing perforations or cavities that extend into the formation in the zone of interest for producing fluids. For example, when casing perforation operations have been completed, it is desirable to know if all perforations have been formed. Moreover, it is also desirable to know how deep the perforation has penetrated the formation and whether the permeability of the formation at the perforation or cavity surface is unimpaired. Still further, for existing or older wells, it is often desirable to know whether or not the perforations have collapsed or enlarged and whether or not the cavity wall will allow flow of fluids into the perforation cavity and the wellbore.

It is to this end that the present invention is directed to provide an improved method for inspecting well perforations and the like.

SUMMARY OF THE INVENTION

The present invention provides a unique method for inspecting the existence, depth and shape of well perforations extending into an earth formation from a wellbore and the like. The present invention also provides an improved method for determining whether or not wellbore perforation or cavity surfaces are sufficiently permeable to permit adequate flow of fluids into the wellbore.

In accordance with an important aspect of the present invention, there is provided an acoustic perforation inspection method which includes apparatus which may be lowered into a wellbore and includes an acoustic signal transmitter and receiver arranged in such a way as to provide for the emission of a broad-band acoustic signal which will excite resonant frequencies in a nearby perforation which may be detected by the acoustic receiver.

In accordance with another aspect of the present invention, a method is provided for determining the shape of a perforation or cavity extending from a wellbore by an acoustic signal reflected from the cavity into the wellbore and to an acoustic signal receiver disposed in the wellbore.

Still further in accordance with the present invention, there is provided a method for determining the permeability of a formation in the vicinity or interface defining the wall of a perforation or cavity by detection of resonant acoustic signals reflected from or generated in the cavity in response to an acoustic signal imposed on the perforation or cavity. The method of the present invention can yield information on the size and shape of a wellbore perforation cavity as well as on the permeability of the cavity wall. Such information can be used to improve sand control practices, diagnose formation damage and evaluate perforation tool or "gun" performance.

Those skilled in the art will further appreciate the advantages and superior features of the present invention upon reading the detailed description which follows in conjunction with the drawing.

DESCRIPTION OF A PREFERRED EMBODIMENT

Figure 1:
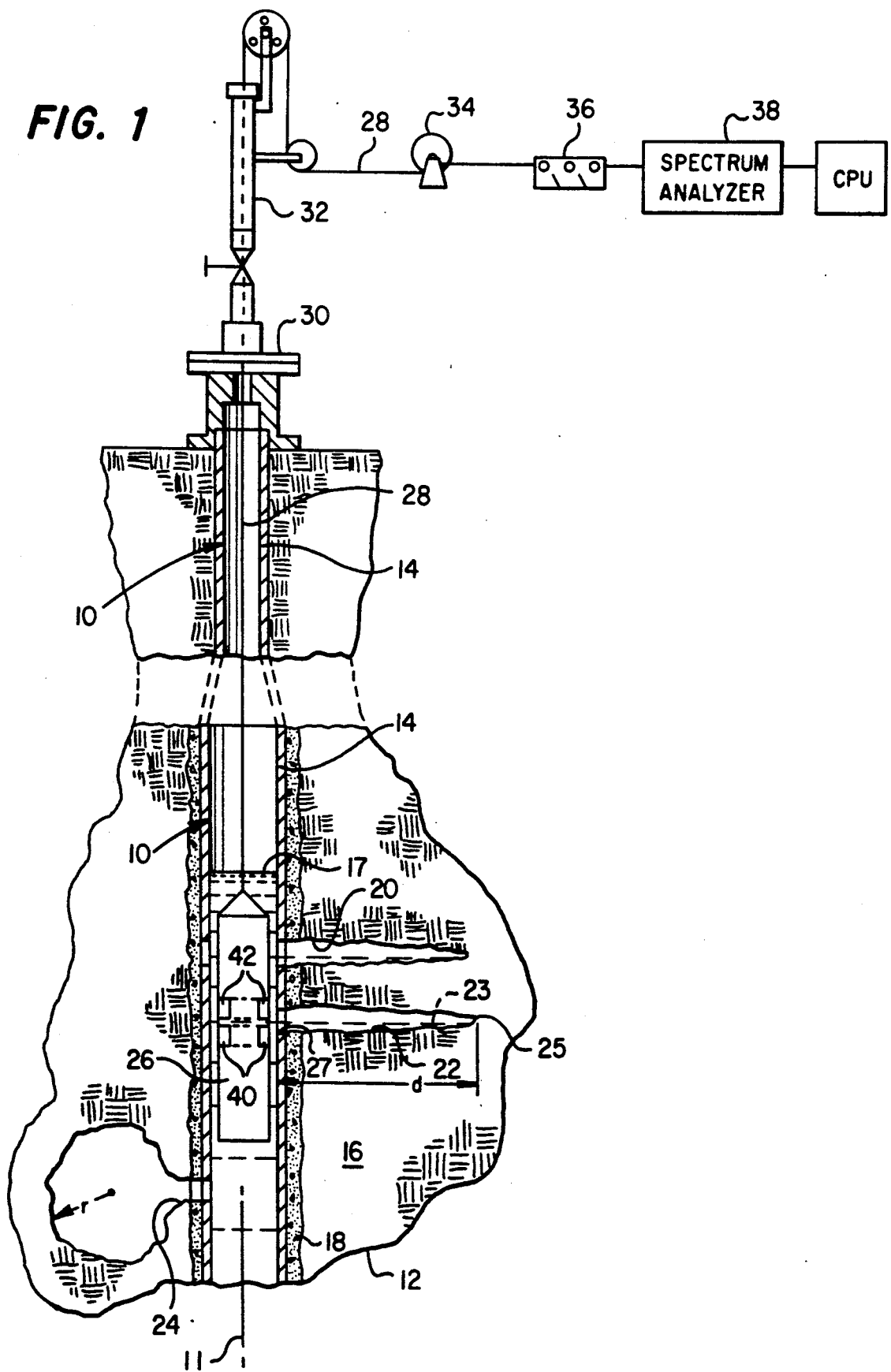
FIG. 1 is a view in somewhat schematic form of a well extending into an earth formation which has been perforated and which is being inspected by a system and method in accordance with the present invention.

In the description which follows, like parts are marked throughout the specification and drawing with the same reference numerals, respectively. The drawing figures are not to scale in the interest of clarity and conciseness.

Referring to FIG. 1, there is illustrated a cased well 10 penetrating an earth formation 12. The well 10 is provided with one or more sections of casing 14 extending into a zone of interest 16. The casing 14 is shown cemented in place by an annular layer of cement 18 provided in a conventional manner. The well 10, which is at least partially filled with a liquid 17, has been perforated at perforations 20, 22 and 24, for example, all done in a conventional manner known to those skilled in the art. The perforations 20 and 22 are generally cylindrical, tubular cavities extending substantially normally to the central longitudinal axis 11 of the casing 14 and into the formation region of interest. The perforation 24 is exemplary of one which has been enlarged to have a somewhat spherical shape of radius "r". The perforations 20, 22 and 24 are illustrated as being inspected in accordance with the method of the present invention by a device 26 which has been lowered into the well 10 on the end of a cable 28 and immersed in the liquid 17. The cable 28 extends upward through the well 10, a wellhead 30 and a cable support apparatus or so-called wireline lubricator 32 to a reel 34. A suitable control apparatus 36 is in communication with the cable 28 and the device 26 to provide for controlling the generation and receipt of acoustic signals with respect to the device 26. The control apparatus 36 may also be operably connected to a frequency spectrum analyzer 38 which is operable in accordance with the method of the present invention to provide for generating and storing data indicating the frequency characteristics of signals received from the device 26 as a function of signal intensity or power.

The device 26 is adapted to include at least one acoustic signal transmitter or generator 40 preferably mounted directly above or below a signal receiver 42. The transmitter 40 and receiver 42 may be similar to the type described in my U.S. Pat. No. 4,949,316 issued Aug. 14, 1990 and assigned to the assignee of the present invention. Suffice it to say that the signal transmitter 40 is operable to generate acoustic signals of a relatively broad frequency band for a limited time by, for instance, sweeping or spike-pulsing-type signal generation. Moreover, the signal receiver 42 is adapted to receive acoustic signals reflected from the wellbore and in particular, the perforations 20, 22 or 24.

In order to inspect the perforations 20, 22 or 24, the device 26 is lowered into the wellbore and traversed slowly once it reaches the vicinity of the perforations while acoustic energy is generated at a selected frequency range by the transmitter 40 while the receiver 42 is operable to receive reflected acoustic signals from the perforations. The receiver 42 will detect the "ringing" of any resonant frequencies excited in a perforation such as the perforations 20, 22 and 24. The amplitude of the "ringing" will reach a maximum when the perforations such as, for example, the perforation 22 are disposed at a midpoint, indicated by the line 23 in FIG. 1, between the transmitter 40 and the receiver 42. Accordingly, the location and existence of a perforation may be confirmed by tracking the position of the device 26 and its angular orientation with respect to the axis 11, for example. The location of the device 26 and its angular orientation about the longitudinal axis 11 coinciding with the cable 28 may be carried out using conventional methods and equipment.

Figure 2:
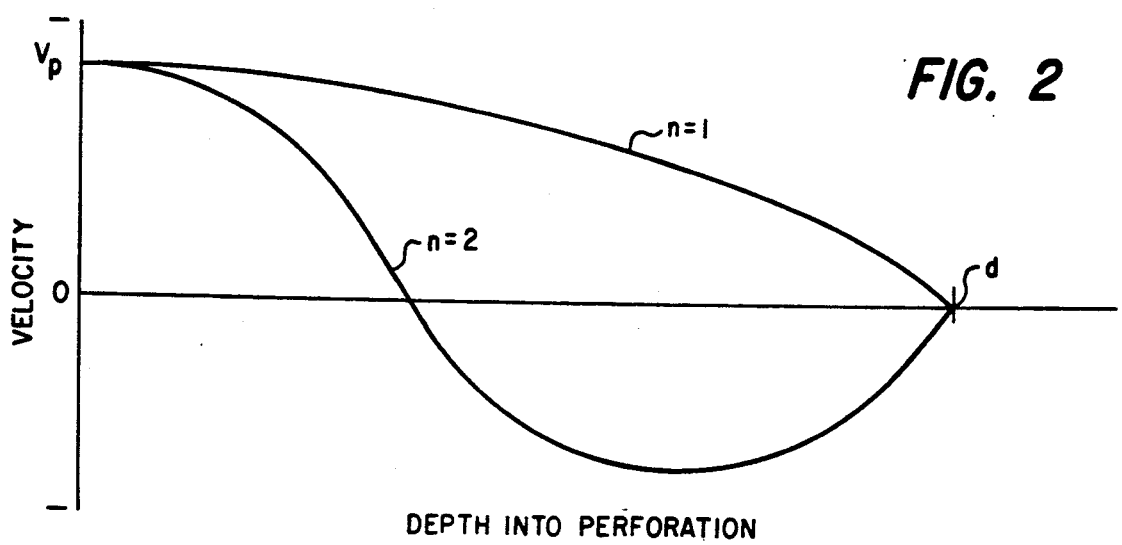
FIG. 2 is a diagram showing the acoustic signal amplitude of two resonant frequencies as a function of depth into a perforation.

If the transmitter 40 generates acoustic signals at frequencies below a few kilohertz, the wavelengths of these signals will be large compared to the tube diameters of most perforations formed in conventional wells. Moreover, the fluid acoustic impedance will normally be much lower than the impedance of the earth formation 16, the cement 18 or the casing 14. Accordingly, the resonant acoustic signals generated in the perforations 20, 22 and 24 will be tube waves with particle velocity nodes at the root end 25 of the perforation 22, for example, and an anti-node at the mouth 27 of the perforation. Thus, the perforation depth will be an odd multiple of a quarter wavelength of an acoustic vibration at the resonant frequency. FIG. 2 illustrates this characteristic. In fact, the resonant frequency ($f_n$) is in accordance with the equation:

$$f_n = (2n-1)v/4d \qquad (A)$$

where
n = the harmonic,
v = the acoustic velocity in the fluid occupying the well and the perforation, and
d = the depth of the perforation from the inner casing surface.

In FIG. 2, the quarter wavelength characteristic is indicated for the case where the fundamental resonant frequency n=1 exists and the first harmonic where n=2 exists, as indicated.

Accordingly, the perforations may be detected by watching for resonant frequency peaks above a suitable threshold amplitude while moving the device 26 slowly up or down the well 10.

Figure 3:
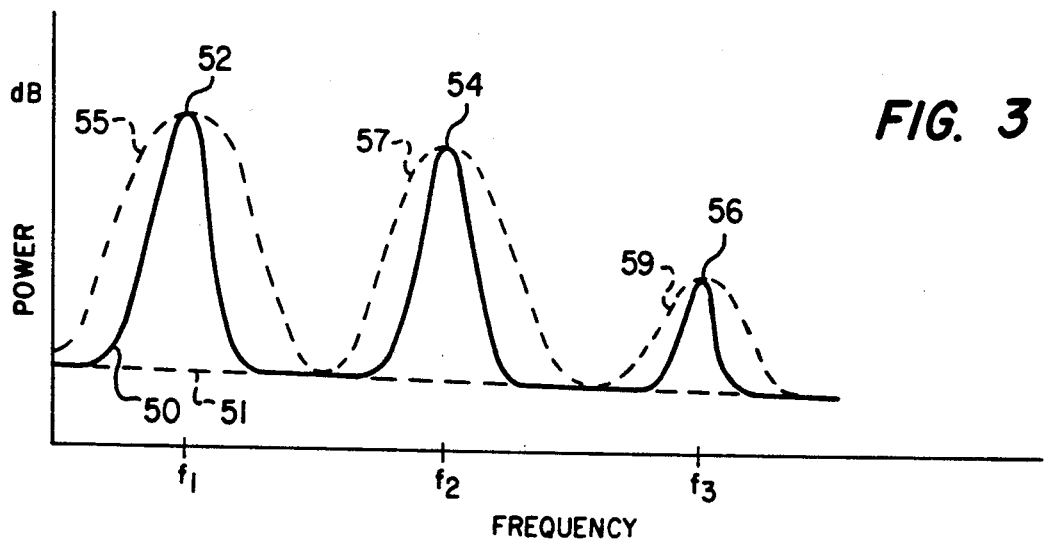
FIG. 3 is a diagram showing the characteristic of acoustic signal intensity or power for a spectral analysis of an acoustic signal to detect the existence of a generally tubular perforation in accordance with the present invention.

FIG. 3 illustrates the acoustic signal intensity or power as a function of frequency. Frequency $f_1$ is the fundamental resonant frequency having a peak at 52 while the second and third harmonics are indicated at the peaks 54 and 56. The relative permeability of the formation zone of interest 16 is characterized by the sharpness of the frequency characteristic 50. For a relatively impermeable cavity surface the solid line designating the frequency spectrum versus power is indicated. A more permeable formation would have a frequency characteristic indicated by the dashed line having the broader or flatter peaks 55, 57 and 59. Moreover, since the acoustic velocity of the fluid 17 occupying the wellbore and perforation spaces may be determined, the distance or depth of the perforation from the well may be determined from the above equation once the fundamental resonant frequency and/or the first and second harmonics are known from the frequency spectrum analysis, as indicated by the plot of FIG. 3. By way of comparison, if no perforations are detected by the device 26 the frequency versus power characteristics would be that of the relatively flat, almost horizontal line 51 in FIG. 3.

Figure 4:
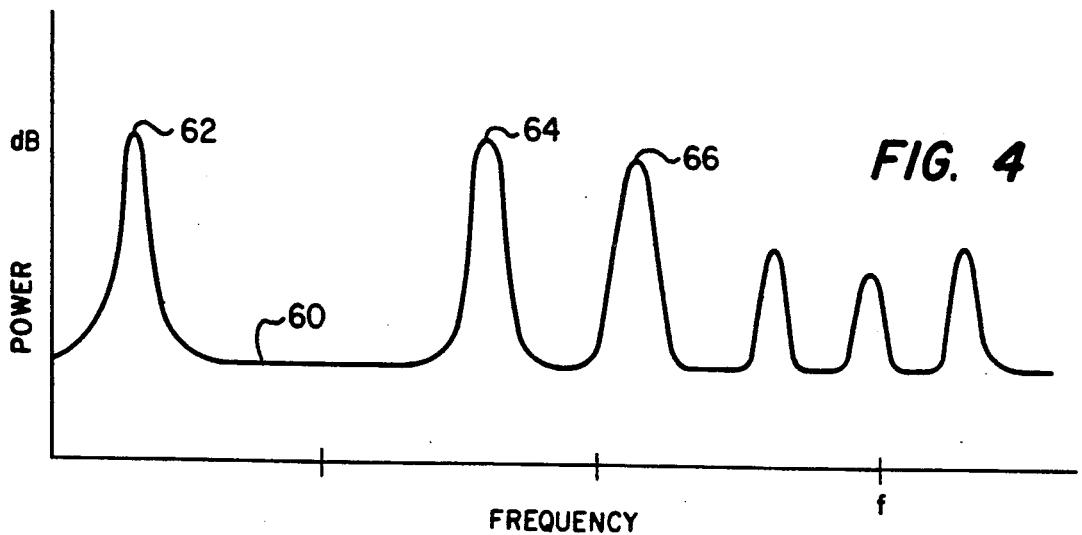
FIG. 4 is a diagram similar to FIG. 3 showing the frequency characteristic for a spherical perforation or cavity as compared with a generally tubular perforation or cavity illustrated in FIG. 3.

As earlier mentioned, the perforation cavity in an older well may become, with time, somewhat spherical as indicated for the cavity or perforation 24. If the plot of frequency versus power is as that indicated in FIG. 4, a spherical cavity completely enclosed in a substantially rigid solid will exhibit a lowest resonance such that the acoustic wavelength is 1.509 times the diameter of the cavity. This compares to a wavelength which is equal to four times the depth of the cavity for a relatively thin tubular perforation. Accordingly, a spherical or equant ellipsoidal cavity has a much "richer" resonance characteristic than a thin, elongated cavity. A thin, elongated cavity has its second resonance at a frequency three times the fundamental frequency. A spherical cavity has resonances at 1.61, 2.16, 2.17, 2.71, 2.85 ... times the lowest resonance. Accordingly, the measured resonant frequencies such as exhibited by the resonant frequencies 64, 66 and so on in FIG. 4 indicate that the cavity is spherical as opposed to being generally elongated and tubular like the perforations 20 and 22. The resonance 62 is the Helmholtz resonance which occurs at a much lower frequency and is due to the narrow opening between the perforation cavity and the wellbore.

The method and apparatus described hereinabove may yield information regarding perforation location, size and shape, and cavity wall permeability utilizing a relatively uncomplicated system and method. The tool or device 26 may be constructed using conventional practices known to those skilled in the art of acoustic logging tools. In addition to utilizing signal transmitter and receiver devices similar to those described in my aforementioned patent, the tool may house the transmitting and receiving circuitry, which may be of conventional design. The signal received by the receiver 42 may be pass-band filtered and amplified by known types of audio frequency circuits. The frequencies of interest range from a few hundred hertz up to a few kilohertz for realistic or commonly-used well perforation sizes. The amplified signal can be sent from the tool or device 26 through the cable 28 to the control unit 36 and recorded on analog or digital tape for later analysis or conducted directly to the spectrum analyzer 38 for on-site analysis.

Some considerations regarding the losses contributing to resonance decay should be mentioned. Equation A1 set out hereinbelow is valid for a circular cylinder cavity of radius r and depth d wherein r is much less than d, if the surrounding formation is perfectly rigid.

$$f_n = (2n-1)v/(4(d+a))  \quad (A1)$$

The quantity d may be increased by an amount $a$, a small correction term arising because the anti-node is not exactly at the mouth of the cavity. Alpha can be considered to be an amount as follows:

$$a = 8r/3\pi.$$

Moreover, to allow for the formation being less than perfectly rigid, the acoustic velocity of the fluid (v) should be replaced by the tube wave velocity which is:

$$v_t = [\rho(1/B + 1/G)]^{\frac{1}{2}} \quad (A2)$$

where
$\rho$ is the fluid density,
B is the fluid bulk modulus, and
G is the formation shear modulus.

When formation permeability is taken into account, the complex wave number, k, for the tube wave propagation becomes:

$$k = w[\rho(1/B + 1/G + 2/(iwrZ))] \quad (A3)$$

where
w is the angular frequency, i is the square root of $-1$, and
$Z = p\ q\ K_1(q)/K_0(q)$
$p = \text{permeability}/(\text{viscosity}*r)$
$q = r \quad * \quad [(i*w*\text{porosity}*\text{viscosity})/(B*\text{permeability})]^{\frac{1}{2}} K_0$ and $K_1$ are modified Bessel functions. The imaginary part of k in equation A3 is the wave attenuation coefficient in nepers per unit length. The logarithmic decrement, defined as the ratio of the energy lost per cycle to the energy stored in the resonator, is useful for characterizing the decay of the resonance. The contribution of the permeability to the logarithmic decrement of the resonance is $$D_p = Im(k)*\text{wavelength} \quad (A4)$$

where Im is the imaginary part of the complex wave number (k).

In addition to permeability losses, the cavity loses acoustic energy through radiation into the borehole and into the formation. Internal dissipation in the fluid will be ignored, not because it is unimportant, but for the sake of simplicity. The treatment here is thus appropriate for liquids in the perforation and borehole, but may be wrong when gas is present.

Radiation from the cavity mouth into the borehole can be approximated by the radiation from a circular hole in a rigid baffle into an infinite fluid half-space. The radiated power is $$P_{bh} = \pi*\rho*r^4*w^2*u_a^2/(4*v) \quad (A5)$$

where $u_a$ is the maximum axial fluid velocity at the mouth of the perforation. The stored energy is approximately given by the total strain energy in the fluid in the cavity when the kinetic energy is at a minimum:

$$U = \pi*\rho*v*d*r^2*u_a^2$$

The fundamental resonance of the perfectly rigid formation solution has been used to obtain this expression. The corresponding contribution to the logarithmic decrement is $$D_{bh} = P_{bh}/(f*U) \approx (\pi r/d)^2 \quad (A6)$$

To obtain an order of magnitude estimate of the power radiated into the formation, we start with expressions given by J. E. White, Underground Sound, Elsevier, N.Y., 1983, (eq. 6-25) for the far-field displacement due to a pressure exerted on a small piece of a cylindrical cavity. White's expressions can be integrated over the cavity length for a quarter wavelength cavity to yield equations for the net displacement. The total radiated power is then given by the integral over a spherical surface of the product of the acoustic impedance and the square of the particle velocity (i.e. the time derivative of the displacement). The result is an expression of the form $$P_{fm} = 2\pi Z_{fm}[(r^2*\rho*v_t*u_a*w^2*d)/(4*G*V_s)]^2*I_r \quad (A7)$$

$I_r$ is a dimensionless function of the fluid velocity, the formation compressional and shear velocities, and the perforation depth. $I_r$ is on the order of 1.

The ratio of (A7) to (A5) is on the order of 1 for reasonable formation and fluid properties. In other words, the radiative loss into the rock is roughly equal to the radiative loss into the borehole. Thus the relative magnitudes of (A4) and (A6) determine whether the resonance decay is dominated by the radiative losses or by the fluid flow through the cavity walls. For permeabilities greater than about 1 md, the fluid flow dominates.

Figure 5:
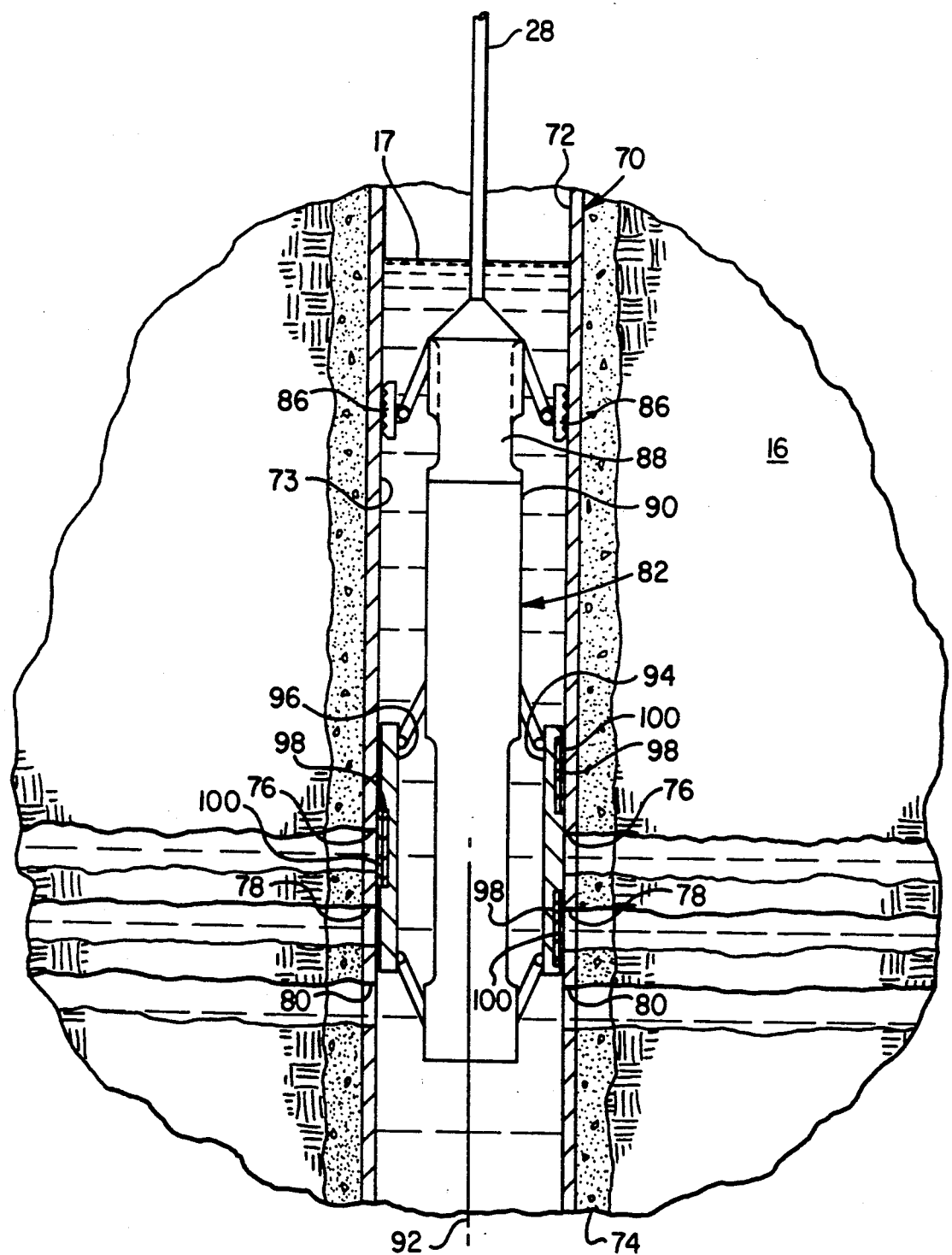
FIG. 5 is a schematic view showing an apparatus according to the invention.

In certain operations, when practicing the method of the present invention, the wellbore perforations may be relatively closely spaced and therefore make it difficult to distinguish the acoustic signal resonance peaks from the perforation in question due to interference by signals from adjacent perforations. FIG. 5 illustrates an embodiment of apparatus in accordance with the present invention which overcomes such problems. Referring to FIG. 5, there is illustrated a wellbore 70 in the formation 16 having a casing 72 which is sealed by an annular cement layer 74 and having opposed sets of perforations 76, 78 and 80 at spaced elevations in the wellbore.

The perforations 76, 78 and 80 are in the process of being evaluated by an apparatus 82 which is connected to the wireline cable 28 and is disposed in the wellbore 70, as shown. The apparatus 82 is provided with extendable and retractable casing grippers 86 which are mounted on a housing portion 88 containing suitable extending and retracting mechanism, not shown. The housing portion 88 is also operably connected to a second housing portion 90 which may be rotated by suitable mechanism, not shown, with respect to the housing portion 88 about a longitudinal axis 92. The housing portion 90 is adapted to support a plurality of circumferentially-spaced and generally evenly opposed sets of support pads 94 and 96, two shown, which are radially extendable and retractable with respect to the axis 92 into at least close proximity to the inner surface of the casing 72. The pads 94 and 96 are adapted to support a plurality of combined acoustic signal transmitter and receiver elements 98 which are disposed for generating acoustic signals toward and into the perforations 76, 78 and 80 and receiving acoustic signals therefrom. Each of the combined signal transmitting and receiving elements 98 is also provided with a suitable protective wear pad 100 which is engageable with the inner wall surface 73 of the casing 72.

The apparatus 82 may be lowered into the wellbore 70 and operated to have its gripper pads 86 extended to momentarily fix the apparatus 82 vertically and rotatably with respect to the casing 72 while the housing portion 90 is rotated slowly and the support pads 94 and 96 are extended radially into the positions illustrated. Acoustic signals may then be generated at the transmitter-receiver elements 98 into the respective perforations and signals received back from the perforation cavities to perform the inspection process. By placing the acoustic signal transmitter-receiver elements 98 in direct contact or extremely close proximity to the casing surface 73, the generation of signals from adjacent perforations during inspection of a particular perforation is minimized. The arrangement of transmitter-receiver elements 98 may be such as to completely scan the wellbore 70 as the apparatus 82 is progressively moved through the wellbore and the housing 90 rotated slowly during such movement. The grippers 86 may be extended and retracted at will to provide for rotation of the housing portion 90 with respect to the housing portion 88 but to also permit movement of the apparatus through the wellbore, as desired.

As illustrated in FIG. 5, the transmitter-receiver elements 98 are sized so as to cover only one perforation at a time. The transmitter-receiver elements 98 will excite resonances in the perforation cavities as previously described. However, the placement of the elements 98 as illustrated will cause a velocity node to occur at the mouth of the perforation, that being the junction of the perforation with the surface 73. Thus a long, relatively small-diameter perforation will resonant at frequencies for which the perforation length is a multiple of half a wavelength of sound in the fluid 17. The spectrum for a spherical cavity resonance will be similar to that described above except that the Helmholtz resonance will be absent.

Although a preferred method and system or apparatus have been described in accordance with the present invention, those skilled in the art will recognize that various substitutions and modifications may be made to the method described without departing from the scope and spirit of the invention as recited in the appended claims.

What is claimed is:

1. A method of determining the location of a perforation into an earth formation from a wellbore comprising the steps of:
    placing means in said wellbore including means for transmitting an acoustic signal and receiving means for receiving an acoustic signal resulting from the transmitted signal;
    moving said means through said wellbore while transmitting acoustic signals of a predetermined range of selected frequencies into said wellbore and receiving reflected acoustic signals from said wellbore resulting from said transmitted acoustic signals; and
    comparing the intensities of the received acoustic signals at said receiving means with the frequencies of said received acoustic signals to determine when a received acoustic signal of a resonant frequency of one said transmitted acoustic signals has been detected by said receiving means as an indication of the location of said perforation with respect to at least one of said means for transmitting and said receiving means.

2. The method set forth in claim 1 including the step of:
    recording the frequency spectrum of the acoustic signals received by said receiving means as a function of acoustic signal intensity.

3. A method for determining the shape of a perforation into an earth formation from a wellbore comprising the steps of:
    placing into said wellbore means for transmitting acoustic signals of selected frequencies and means for receiving acoustic signals of selected frequencies;
    transmitting acoustic signals into said wellbore and into said perforation of a predetermined range of selected frequencies and receiving acoustic signals from said perforation resulting from said transmitted signals;
    determining plural resonant frequencies of the acoustic signals received from said perforation including a fundamental resonant frequency and at least one harmonic frequency by comparing the intensities of said acoustic signals received by said means for receiving with the frequencies of said acoustic signals received by said means for receiving over a selected frequency bandwidth; and
    comparing said plural resonant frequencies to determine the multiple of said at least one harmonic frequency as compared with said fundamental resonant frequency as an indication of the shape of said perforation.

4. A method for determining the permeability of the wall surface of a perforation into an earth formation from a wellbore comprising the steps of:
    placing into said wellbore means for transmitting acoustic signals of selected frequencies and means for receiving acoustic signals of selected frequencies;
    transmitting acoustic signals into said wellbore and said perforation of selected frequencies and receiving acoustic signals of selected frequencies resulting from said transmitting signals;
    determining at least a first peak frequency of acoustic signals received by said means for receiving;
    determining the power of said acoustic signals received by said means for receiving over a predetermined range of frequencies near said first peak frequency; and
    comparing the power of said acoustic signals received by said means for receiving over said predetermined range of frequencies with the power of reference acoustic signals over a similar range of frequencies measured in a perforation in one of a reference formation more permeable and less permeable than said earth formation to determine the relative permeability of said wall surface.

5. A method of determining the permeability of the wall surface of a perforation into an earth formation from a wellbore comprising the steps of:
    placing means in said wellbore including means for transmitting acoustic signals and means for receiving acoustic signals resulting from the transmitted signals;
    moving said means through said wellbore while transmitting acoustic signals of predetermined selected frequencies into said wellbore and receiving acoustic signals reflected from said wellbore and a perforation opening into said wellbore;

comparing the acoustic powers of the received acoustic signals at said means for receiving with the frequencies of the received acoustic signals to determine when a resonant frequency has been detected by said means for receiving as an indication of the location of said perforation with respect to at least one of said means for transmitting and said means for receiving;

determining the acoustic powers of said received acoustic signals over a predetermined range of frequencies near said resonant frequency; and comparing the acoustic powers of said received acoustic signals over said predetermined range of frequencies with the acoustic power of a reference signal measured in a perforation in one of a reference formation more permeable and less permeable than said earth formation to determine the relative permeability of said wall surface.

* * * * *